（12） United States Patent
Liang et al.

(10) Patent No.: US 9,863,220 B2
(45) Date of Patent: Jan. 9, 2018

(54) HYDROPHOBICALLY MODIFIED AMINE-CONTAINING POLYMERS FOR MITIGATING SCALE BUILDUP

(71) Applicant: Halliburton Energy Services, Inc., Houston, TX (US)

(72) Inventors: Feng Liang, Cypress, TX (US); Philip D. Nguyen, Houston, TX (US); Tanner W. Green, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 324 days.

(21) Appl. No.: 14/435,816

(22) PCT Filed: Jan. 8, 2014

(86) PCT No.: PCT/US2014/010643
§ 371 (c)(1),
(2) Date: Apr. 15, 2015

(87) PCT Pub. No.: WO2014/110110
PCT Pub. Date: Jul. 17, 2014

(65) Prior Publication Data
US 2015/0267520 A1   Sep. 24, 2015

Related U.S. Application Data

(63) Continuation-in-part of application No. 13/766,892, filed on Feb. 14, 2013, now Pat. No. 9,404,031.
(Continued)

(51) Int. Cl.
*E21B 43/04*  (2006.01)
*C09K 8/536* (2006.01)
(Continued)

(52) U.S. Cl.
CPC .............. *E21B 43/04* (2013.01); *C09K 8/528* (2013.01); *C09K 8/536* (2013.01); *C09K 8/68* (2013.01);
(Continued)

(58) Field of Classification Search
CPC .......... C09K 8/805; C09K 8/032; C09K 8/68; C09K 8/528; C09K 8/5751; C09K 8/62;
(Continued)

(56) References Cited

U.S. PATENT DOCUMENTS 4,042,031 A   8/1977   Knapp
5,775,425 A   7/1998   Weaver et al.
(Continued)

FOREIGN PATENT DOCUMENTS

CA   2772833   3/2010
CA   2833833   11/2012
(Continued)

OTHER PUBLICATIONS

International Search Report and Written Opinion for PCT/US2014/010643 dated Apr. 23, 2014.
(Continued)

*Primary Examiner* — Zakiya W Bates
(74) *Attorney, Agent, or Firm* — McDermott Will & Emery LLP

(57) ABSTRACT

Hydrophobically modified amine-containing polymers ("HMAP") may be useful in mitigating scale buildup in a subterranean formation. For example, a method may include preparing a treatment fluid that comprises a base fluid and a plurality of HMAP-coated particulates that comprise particulates at least partially coated with an HMAP, wherein the HMAP comprises a plurality of hydrophobic modifications on an amine-containing polymer; introducing the treatment fluid into a wellbore penetrating a subterranean formation;
(Continued)

forming a particulate pack that comprises at least some of the HMAP-coated particulates; and inhibiting scale buildup on the HMAP-coated particulates.

18 Claims, 1 Drawing Sheet

Related U.S. Application Data

(60) Provisional application No. 61/750,077, filed on Jan. 8, 2013.

(51) Int. Cl.
| C09K 8/80 | (2006.01) |
| E21B 43/267 | (2006.01) |
| E21B 43/02 | (2006.01) |
| E21B 37/06 | (2006.01) |
| C09K 8/528 | (2006.01) |
| C09K 8/68 | (2006.01) |
| C09K 8/70 | (2006.01) |
| C09K 8/88 | (2006.01) |
| C09K 8/92 | (2006.01) |
| C09K 8/74 | (2006.01) |

(52) U.S. Cl.
CPC ............... *C09K 8/70* (2013.01); *C09K 8/805* (2013.01); *C09K 8/88* (2013.01); *C09K 8/92* (2013.01); *E21B 37/06* (2013.01); *E21B 43/025* (2013.01); *E21B 43/267* (2013.01); C09K 8/74 (2013.01)

(58) Field of Classification Search
CPC ......... C09K 8/88; E21B 43/267; E21B 43/26; E21B 37/06
See application file for complete search history.

(56) References Cited

U.S. PATENT DOCUMENTS

| 5,898,811 | A | 4/1999 | DiGiovanni et al. |
| 6,047,772 | A | 4/2000 | Weaver et al. |
| 7,063,151 | B2 | 6/2006 | Nguyen et al. |
| 7,134,497 | B1 | 11/2006 | Chatterji et al. |
| 7,392,847 | B2 | 7/2008 | Gatlin et al. |
| 7,398,825 | B2 | 7/2008 | Nguyen et al. |
| 7,493,957 | B2 | 2/2009 | Nguyen et al. |
| 7,571,767 | B2 | 8/2009 | Parker et al. |
| 7,581,593 | B2 | 9/2009 | Pankratz et al. |
| 7,730,950 | B2 | 6/2010 | Nguyen et al. |
| 7,766,099 | B2 | 8/2010 | Nguyen |
| 7,934,557 | B2 | 5/2011 | Nguyen |
| 7,956,017 | B2 | 6/2011 | Gatlin et al. |
| 8,105,956 | B2 | 1/2012 | Ho et al. |
| 2003/0234103 | A1 | 12/2003 | Lee et al. |
| 2006/0035790 | A1 | 2/2006 | Okell et al. |
| 2006/0124309 | A1 | 6/2006 | Nguyen et al. |
| 2006/0289162 | A1 | 12/2006 | Santra et al. |
| 2009/0095535 | A1 | 4/2009 | Nguyen |
| 2010/0069536 | A1 | 3/2010 | Sau |
| 2012/0220504 | A1 | 8/2012 | Rickman et al. |
| 2012/0279704 | A1 | 11/2012 | Eoff et al. |
| 2013/0274170 | A1 | 10/2013 | Yuan-Huffman et al. |
| 2014/0000891 | A1* | 1/2014 | Mahoney ............... C09K 8/805 166/280.2 |
| 2016/0319183 | A1 | 11/2016 | Vo et al. |

FOREIGN PATENT DOCUMENTS

| WO | WO-2001094742 A1 | 12/2001 |
| WO | 2014110110 A1 | 7/2014 |
| WO | WO-2014109939 A1 | 7/2014 |
| WO | 2015105521 A1 | 7/2015 |

OTHER PUBLICATIONS

Nguyen et al., Water-Based, Frac-Pack Remedial Treatment Extends Well Life, SPE European Formation Damage Conference held in Noorwijk, The Netherlands, Jun. 2011, SPE 144065.
Canadian Intellectual Property Office based on PCT No. US20140100022 dated Apr. 26, 2016.

* cited by examiner

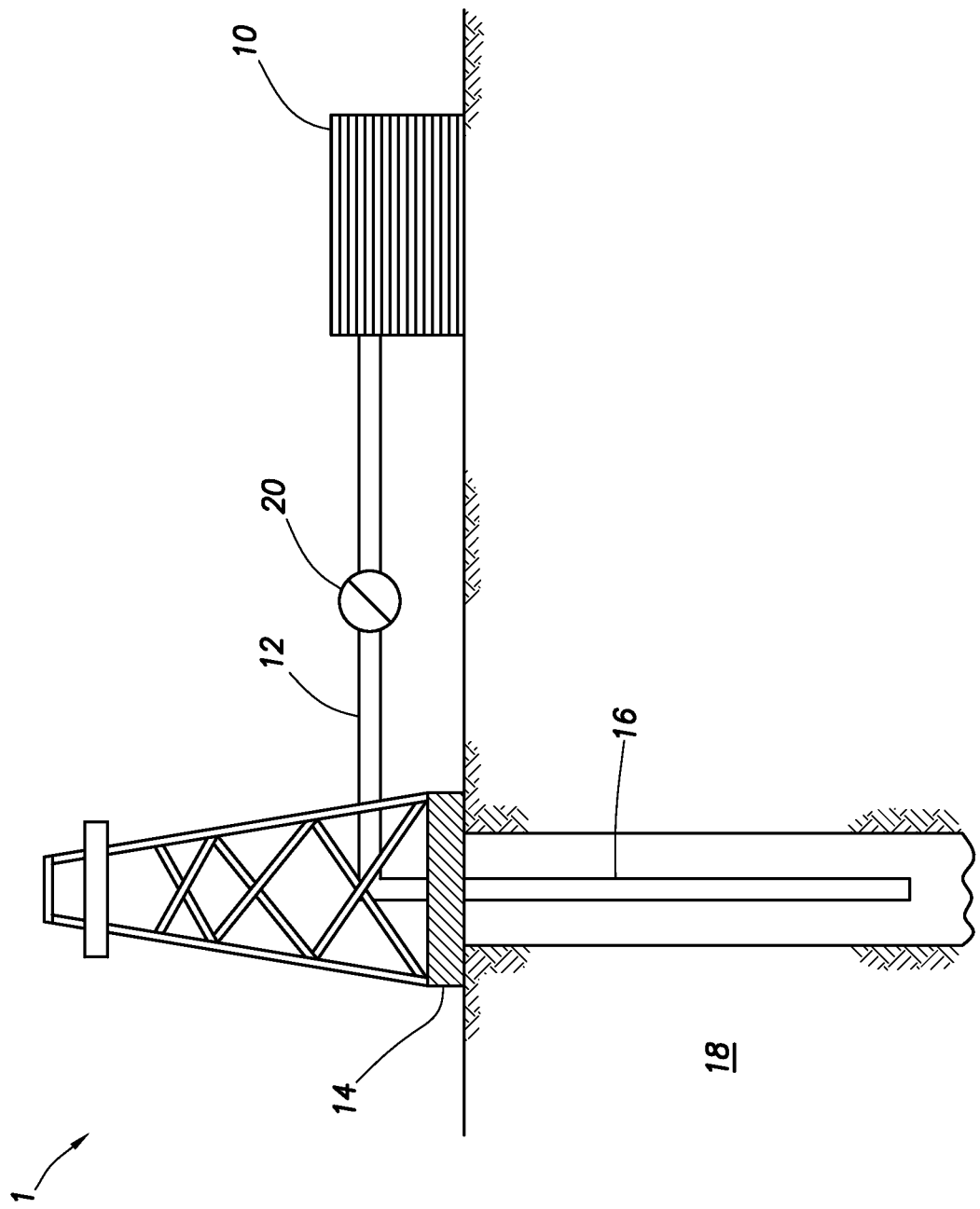

US 9,863,220 B2

HYDROPHOBICALLY MODIFIED AMINE-CONTAINING POLYMERS FOR MITIGATING SCALE BUILDUP

CROSS-REFERENCE TO RELATED APPLICATIONS

This application claims the benefit of U.S. Provisional Application No. 61/750,077, filed Jan. 8, 2013, and U.S. Nonprovisional application Ser. No. 13/766,892, filed on Feb. 14, 2013.

BACKGROUND

The present application relates to methods and compositions for mitigating scale buildup in a subterranean formation with stabilizers that include hydrophobically modified amine-containing polymers.

Formation fluids encountered in hydrocarbon production operations are generally complex mixtures of aliphatic hydrocarbons, aromatics, hetero-atomic molecules, anionic and cationic salts, acids, sands, silts, clays, and a vast array of other components. Because of the complex composition of the formation fluids and exposure to sometimes severe conditions of heat, pressure, and turbulence during production of the formation fluids, scale (i.e., mineral or solid salt deposits) often precipitate and buildup in the subterranean formation (e.g., in the formation matrix and in proppant packs) and on the production equipment (e.g., sand screens and production tubing).

Scale can lead to corrosion of the production equipment, which shortens the lifetime of the equipment. Further, scale buildup in the formation may cause decreased permeability, whereas scale buildup in the equipment may choke off the flow path, both of which reduce amount of hydrocarbons that can be produced from the formation. In some instances, the scale can be cleaned up. However, the operations are often time-consuming and costly and, in some instances, may utilize harsh chemicals.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system for delivering fluids described herein to a downhole location, according to one or more embodiments.

DETAILED DESCRIPTION

The present application relates to methods and compositions for mitigating scale buildup in a subterranean formation with stabilizers that include hydrophobically modified amine-containing polymers.

As used herein, the term "hydrophobically modified amine-containing polymer" (or "HMAP") is used to describe amine-containing polymers (i.e., polymers with an amine in the polymer backbone, polymer branch, or in both the backbone and branches) that have been hydrophobically modified. In some embodiments, the HMAP described herein may be used to coat surfaces (e.g., formation surfaces and particle surfaces) and mitigate the buildup of scale and the associated reduced formation permeability. As such, the HMAP described herein may be useful in reducing the frequency with which costly, time-consuming remedial operations need to be performed to remove scale buildup.

As used herein, the term "coating," and the like, does not imply any particular degree of coating on a particulate. In particular, the terms "coat" or "coating" do not imply 100% coverage by the coating on a particulate. It should be understood that the terms "particulate" or "particle" as used in this disclosure, includes all known shapes of materials, including substantially spherical materials, fibrous materials, polygonal materials (such as cubic materials), and combinations thereof.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques. Further, it should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

As described above, the HMAP described herein are amine-containing polymers that have been hydrophobically modified. Examples of amine-containing polymers may include, but are not limited to, polyamines (e.g., spermidine and spermine), polyimines (e.g., poly(ethylene imine) and poly(propylene imine)), polyamides, poly(2-(N,N-dimethylamino)ethyl methacrylate), poly(2-(N,N-diethylamino)ethyl methacrylate), poly(vinyl imidazole), and the like, any copolymer thereof, and any combination thereof. Further, amine-containing polymers may include a copolymer of at least one of the foregoing amine-containing polymers (or corresponding monomer unit) and at least one polymer (or corresponding monomer unit) that does not contain an amine (e.g., polyethylene, polypropylene, polyethylene oxide, polypropylene oxide, polyvinylpyridine, polyacrylic acid, polyacrylate, polymethacrylate, and the like).

Hydrophobic modifications may, in some embodiments, include, but are not limited to, a $C_4$-$C_{30}$ characterized by at least one selected from the group consisting of a straight chain, a branched chain, comprising an unsaturated C—C bond, comprising an aryl group, and the like, and any combination thereof.

Formulas I-III provide examples of the HMAP described herein wherein Z is R or COR, and wherein R is a hydrophobic modification described herein (e.g., a $C_4$-$C_{30}$ characterized by at least one selected from the group consisting of a straight chain, a branched chain, comprising an unsaturated C—C bond, comprising an aryl group, and the like, and any combination thereof).

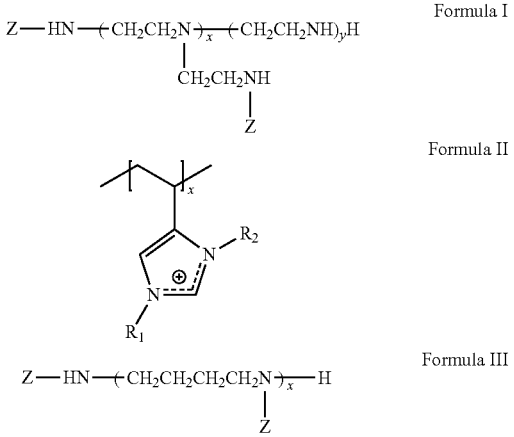

Formula I

Formula II

Formula III

In some embodiments, the HMAP may have a degree of modification such that the of amount hydrophobic modification ranges from a lower limit of about 0.1%, 1%, 10%, or 30% by molar ratio of amine content to an upper limit of about 99.9%, 95%, 70%, or 50% by molar ratio of amine content, and wherein the amount of hydrophobic modification may range from any lower limit to any upper limit and encompass any subset therebetween.

In some embodiments, the HMAP may have a molecular weight ranging from a lower limit of about 300 g/mol, 1,000 g/mol, 10,000 g/mol, or 100,000 g/mol to an upper limit of about 3,000,000 g/mol, 1,000,000 g/mol, or 100,000 g/mol, and wherein the molecular weight may range from any lower limit to any upper limit and encompass any subset therebetween.

In some embodiments, hydrophobic modifications may be achieved via a plurality of reaction schemes including, but not limited to, amidation with carboxy terminal compounds (e.g., fatty acids), quaternization by alkyl halides, addition reactions with alpha-olefins, nucleophilic attack with alkyl compounds having active groups (e.g., a terminal epoxide), and the like, and any combination thereof.

In some embodiments, the HMAP described herein may be present in a treatment fluid at a concentration ranging from a lower limit of about 0.01%, 0.05%, or 0.1% by weight of the base fluid to an upper limit of about 3%, 1%, or 0.5% by weight of the base fluid, wherein the concentration of the HMAP may range from any lower limit to any upper limit and encompass any range therebetween.

Some embodiments may involve coating particulates (e.g., formation fines, formation sand, proppants, and/or gravel particulates) with an HMAP described herein, thereby inhibiting the formation, buildup, or both of scale on the HMAP-coated particulates. As used herein, the term "HMAP-coated particulates" refer to particles that are at least partially coated with HMAP described herein.

Some embodiments may involve precoating particulates (e.g., gravel particulates and/or proppants) with the HMAP before addition to a treatment fluid (i.e., adding HMAP-coated particulates to a treatment fluid). In some instances, the HMAP-coated particulates may be produced by dry-coating or wet-coating methods.

In other embodiments, the particulates may be coated with the HMAP while preparing the treatment fluid. For example, some embodiments may involve adding HMAP to a mixture comprising the base fluid and particulates. In another example, some embodiments may involve adding particulates to a mixture of base fluid and the HMAP. In either embodiment or a hybrid thereof, the resultant treatment fluid may then be introduced in the wellbore.

Additional embodiments may involve introducing a treatment fluid comprising the HMAP into the subterranean formation where the particulates (e.g., formation fines, formation sand, gravel particulates, and/or proppants) reside and coating the particulates residing in the formation with HMAP.

Combinations of the foregoing embodiments may also be implemented. For example, treatment fluid comprising HMAP-coated particulates and additional HMAP may be utilized.

In some instances, it may be desirable to push the treatment fluid further into the subterranean formation so as to treat portions further from the wellbore. Some embodiments may involve introducing a treatment fluid comprising a low-viscosity base fluid (e.g., an aqueous-miscible fluid like isopropyl alcohol or a glycol ether) and HMAP into the subterranean formation, and then introducing a higher viscosity fluid (e.g., water or a brine) into the subterranean formation to push the treatment fluid with the HMAP deeper into the subterranean formation. In some embodiments, the treatment fluid may comprise particulates, HMAP-coated particulates, or both. These methods may be used in combination with the foregoing methods.

In some embodiments, an optional coupling agent (e.g., a silane coupling agent or surfactant) may be used, among other things, to act as a mediator to help bond the HMAP and the particulates. Examples of suitable silane coupling agents include, but are not limited to, N-2-(aminoethyl)-3-aminopropyltrimethoxysilane, and 3-glycidoxypropyltrimethoxysilane, and combinations thereof. In some embodiments, the coupling agent may be present in a treatment fluid at a concentration ranging from a lower limit of about 0.001%, 0.05%, or 0.1% by weight of the HMAP to an upper limit of about 3%, 1%, or 0.5% by weight of the HMAP, wherein the concentration of the silane coupling agent may range from any lower limit to any upper limit and encompass any range therebetween.

In some embodiments, the particulates or HMAP-coated particulates may be present in a treatment fluid at a concentration ranging from a lower limit of about 0.1 pounds per gallon ("ppg"), 1 ppg, or 5 ppg to an upper limit of about 30 ppg, 20 ppg, or 10 ppg by volume of the treatment fluid, wherein the concentration of the particulates or HMAP-coated particulates may range from any lower limit to any upper limit and encompass any range therebetween.

Some embodiments may involve using HMAP described herein and/or HMAP-coated particulates in fracturing operations, which may involve (1) optionally introducing a prepad fluid into the subterranean formation, (2) introducing a pad fluid into the subterranean formation to initiate and create at least one fracture, (3) introducing a proppant slurry into the subterranean formation so as to place the proppant into the fracture, and (4) optionally introducing a flush fluid into the subterranean formation, thereby forming a proppant pack. Prepad fluids are generally introduced at or below matrix pressure and before pad fluids. Pad fluids are generally introduced above matrix pressure (i.e., at a pressure sufficient to create or extend at least one fracture in the subterranean formation). In some embodiments, at least one of the prepad fluid, pad fluid, and flush fluid may comprise the HMAP's described herein. In some embodiments, proppant slurries may comprise at least one of proppant, proppant in combination with an HMAP, HMAP-coated proppant, or HMAP-coated proppant in combination with HMAP.

Some embodiments may involve using HMAP described herein in post-acidizing operations. For example, some embodiments may involve introducing an acidizing fluid into a wellbore penetrating a subterranean formation, then introducing a treatment fluid comprising a base fluid and an HMAP, and allowing the HMAP to at least partially coat particulates in the subterranean formation.

Some embodiments may involve using HMAP described herein in gravel packing operations. In some instances, gravel packing operations may involve forming a gravel pack in a wellbore with a treatment fluid that comprises at least one of gravel particulates in combination with an HMAP, HMAP-coated gravel particulates, or HMAP-coated gravel particulates in combination with HMAP. In other instances, gravel-packing operations may involve forming a gravel pack in a wellbore, then treating the gravel pack with a treatment fluid comprising an HMAP described herein.

It should be noted that when HMAP described herein are used in an operation in more than one treatment fluid, whether free or as a coating, the composition and/or concentration of the HMAP in the various treatment fluids may independently be the same or different.

The methods and compositions described herein may be used in full-scale operations or pills. As used herein, a "pill" is a type of relatively small volume of specially prepared treatment fluid placed or circulated in the wellbore.

Some embodiments may involve producing hydrocarbon fluids from the portion of the subterranean formation having been treated with the HMAP and/or HMAP-coated particulates described herein.

Base fluids suitable for use in conjunction with the present may include aqueous fluids, aqueous-miscible fluids, and any combination thereof.

Aqueous fluids suitable for use in conjunction with the embodiments described herein may comprise fresh water, saltwater (e.g., water containing one or more salts dissolved therein), brine (e.g., saturated salt water or produced water), seawater, produced water (e.g., water produced from a subterranean formation), aqueous-miscible fluids, and any combination thereof. Generally, the water may be from any source, provided that it does not contain components that might adversely affect the stability and/or performance of the first treatment fluids or second treatment fluids.

Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous fluid, and any combination thereof.

In certain embodiments, the density of the base fluid can be adjusted, among other purposes, to provide additional particulate transport and suspension in the treatment fluids used in the methods described herein. In certain embodiments, the pH of the base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

In some embodiments, the base fluid may be foamed. In some embodiments a treatment fluid for use in conjunction with the embodiments described herein may comprise a base fluid, a gas, a foaming agent, and at least one of particulates, particulates in combination with HMAP, HMAP-coated particulates, or HMAP-coated particulates in combination with HMAP.

In some embodiments, the gas is selected from the group consisting of nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the embodiments described herein may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

Suitable proppants for use in conjunction with the embodiments described herein may be any material suitable for use in subterranean operations. Examples of these particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the embodiments described herein. In particular embodiments, preferred mean particulates size distribution ranges are one or more of 6/12, 8/16, 12/20, 16/30, 20/40, 30/50, 40/60, 40/70, or 50/70 mesh. Moreover, fibrous materials, that may or may not be used to bear the pressure of a closed fracture, may be included in certain described herein.

In some embodiments, treatment fluids described herein may further comprise additives. Suitable additives may include, but are not limited to, salts, weighting agents, inert solids, fluid loss control agents, emulsifiers, dispersion aids, corrosion inhibitors, emulsion thinners, emulsion thickeners, viscosifying agents, gelling agents, surfactants, particulates, proppants, gravel particulates, lost circulation materials, pH control additives, breakers, biocides, crosslinkers, stabilizers, chelating agents, gas hydrate inhibitors, mutual solvents, oxidizers, reducers, friction reducers, clay stabilizing agents, or any combination thereof. One skilled in the art with the benefit of this disclosure should understand the appropriate additives and concentrations thereof for use in conjunction with the embodiments described herein to achieve the desired result and so as to maintain operability of the methods described herein.

In various embodiments, systems may be configured for delivering the fluids described herein to a downhole location. In various embodiments, the systems can comprise a pump fluidly coupled to a tubular, the tubular containing a treatment fluid comprising a base fluid and a plurality of HMAP-coated particulates that comprise particulates at least partially coated with an HMAP, wherein the HMAP comprises a plurality of hydrophobic modifications on an amine-containing polymer. In various embodiments, the systems can comprise a pump fluidly coupled to a tubular, the tubular containing a treatment fluid comprising a base fluid and HMAP, wherein the HMAP comprises a plurality of hydrophobic modifications on an amine-containing polymer.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a treatment fluid that includes a base fluid and a plurality of HMAP-coated particulates that comprise particulates at least partially coated with an HMAP, wherein the HMAP comprises a plurality of hydrophobic modifications on an amine-containing polymer;

B. a method that includes preparing a treatment fluid that comprises a base fluid and a plurality of HMAP-coated particulates that comprise particulates at least partially coated with an HMAP, wherein the HMAP comprises a plurality of hydrophobic modifications on an amine-containing polymer; introducing the treatment fluid into a wellbore penetrating a subterranean formation; forming a particulate pack that comprises at least some of the HMAP-coated particulates; and inhibiting scale buildup on the HMAP-coated particulates;

C. a system that includes a wellhead with a tubular extending therefrom and into a wellbore in a subterranean formation; and a pump fluidly coupled to a tubular, the tubular containing a treatment fluid that comprises a base fluid and a plurality of HMAP-coated particulates, wherein the HMAP comprises a plurality of hydrophobic modifications on an amine-containing polymer;

D. a treatment fluid that includes a base fluid and HMAP, wherein the HMAP comprises a plurality of hydrophobic modifications on an amine-containing polymer;

E. a method that includes providing a treatment fluid that comprises a base fluid and an HMAP, the HMAP comprising a plurality of hydrophobic modifications on an amine-containing polymer; introducing the treatment fluid into a wellbore penetrating a subterranean formation, wherein a portion of the wellbore, a portion of the subterranean formation, or both comprise a plurality of particulates; coating at least some of the particulates with HMAP, thereby forming HMAP-coated particulates; and inhibiting scale buildup on the HMAP-coated particulates; and F. a system that includes a wellhead with a tubular extending therefrom and into a wellbore in a subterranean formation; and a pump fluidly coupled to a tubular, the tubular containing a treatment fluid that comprises a base fluid and an HMAP, wherein the HMAP comprises a plurality of hydrophobic modifications on an amine-containing polymer.

Each of Embodiments A, B, C, D, E, and F may have one or more of the following additional elements in any combination: Element 1: wherein the hydrophobic modification comprises a $C_4$-$C_{30}$ characterized by at least one selected from the group consisting of a straight chain, a branched chain, comprising an unsaturated C—C bond, comprising an aryl group, and any combination thereof; Element 2: wherein the amine-containing polymer comprises at least one selected from the group consisting of a polyamine, a polyimine, a polyamide, poly(2-(N,N-dimethylamino)ethyl methacrylate), poly(2-(N,N-diethylamino)ethyl methacrylate), poly(vinyl imidazole), any copolymer thereof, and any combination thereof; Element 3: wherein the HMAP has a degree of modification such that the amount of the hydrophobic modifications of about 0.1% to about 99.9% by molar ratio of amine content; Element 4: wherein the HMAP has a molecular weight of about 300 g/mol to about 3,000,000 g/mol; and Element 5: wherein the HMAP comprises a polymer according to at least one of Formulas I, II, or III (above). By way of non-limiting example, exemplary combinations may include: Element 1 in combination with Element 2 and optionally Element 5; Element 1 in combination with Element 5; Element 2 in combination with Element 5; Element 3 in combination with any of the foregoing; Element 3 in combination with Element 1; Element 3 in combination with Element 2; Element 3 in combination with Element 5; Element 3 in combination with any of the foregoing; Element 3 in combination with Element 1; Element 3 in combination with Element 2; Element 3 in combination with Element 5; and Element 3 in combination with Element 4.

Each of Embodiments A, B, and C may have one or more of the following additional elements in any combination: Element 6: wherein the particulate comprises at least one selected from the group consisting of a proppant, a gravel particulate, and any combination thereof; Element 7: wherein the HMAP-coated particulates are present in an amount ranging from about 0.1 pounds per gallon to about 30 pounds per gallon of the treatment fluid; and Element 8: wherein the HMAP-coated particulates further comprise a coupling agent. By way of non-limiting example, exemplary combinations may include: Element 6 in combination with Element 7 and optionally Element 8; Element 6 in combination with Element 8; Element 7 in combination with Element 8; any of the foregoing in combination with one or more of Elements 1-5; and any one of Elements 6-8 in combination with one or more of Elements 1-5.

Embodiment B may have one or more of the following additional elements in any combination: Element 9: the method further including forming the HMAP-coated particulates by dry-coating the particulates with the HMAP; and adding the HMAP-coated particulates to the treatment fluid; Element 10: wherein preparing the treatment fluid involves adding HMAP to a mixture of the base fluid and the particulates; Element 11: wherein preparing the treatment fluid involves adding the particulates to a mixture of the base fluid and the HMAP; and Element 12: introducing a pad fluid into the subterranean formation at a pressure sufficient to create or extend at least one fracture in the subterranean formation before introducing the treatment fluid. By way of non-limiting example, exemplary combinations may include: Element 9 in combination with Element 12; Element 10 in combination with Element 12; Element 11 in combination with Element 12; any of the foregoing in combination with one or more of Elements 1-8; and any one of Elements 9-12 in combination with one or more of Elements 1-8.

Each of Embodiments D, E, and F may have one or more of the following additional elements in any combination: Element 13: wherein the HMAP is present in an amount ranging from about 0.01% to about 3% by weight of the base fluid; and Element 14: wherein the treatment fluid further comprises a coupling agent in an amount ranging from about 0.001% to about 3% by weight of the HMAP. By way of non-limiting example, exemplary combinations may include: Element 13 in combination with Element 14; and at least one of Elements 13 or 14 in combination with one or more of Elements 1-5.

Embodiment D may have one or more of the following additional elements in any combination: Element 15: wherein the particulates comprise at least one selected from the group consisting of formation fines, formation sand, a proppant, a gravel particulate, and any combination thereof; Element 16: the method further including forming a proppant pack in the portion of the wellbore, the portion of the subterranean formation, or both before introducing the treatment fluid; Element 17: the method further including forming a gravel pack in the portion of the wellbore, the portion of the subterranean formation, or both before introducing the treatment fluid; and Element 18: the method further including introducing an acidizing fluid into the subterranean formation before introducing the treatment fluid. By way of non-limiting example, exemplary combinations may include: Element 15 in combination with Element 16; Element 15 in combination with Element 17; Element 15 in combination with Element 18; any of the foregoing in combination with at least one of Elements 1, 2, 3, 4, 5, 13, or 14; and any one of Elements 15-18 in combination with one or more of 1, 2, 3, 4, 5, 13, or 14.

One or more illustrative embodiments incorporating the invention embodiments disclosed herein are presented herein. Not all features of a physical implementation are described or shown in this application for the sake of clarity. It is understood that in the development of any such physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the embodiments of the present invention, the following examples of preferred or representative embodiments are given. In no way should the following examples be read to limit, or to define, the scope of the invention.

EXAMPLES

Example 1

Titanium flow cells (1-inch inner diameter and 2-inch length) was packed with 70/170-mesh sand, which simulates formation sand. Pressure transducers were installed at the inlet and outlet of the flow cells for measuring the pressure drop across the sand pack. The backpressure regulator was set at 800 psi. Each of the sand pack was first saturated by flowing four pore volumes (~50 mL) of 3% KCl brine and heated to 200° F.

In a control experiment, a simulated seawater was flowed at a rate of 5 mL/min. The simulated seawater was produced by simultaneous injecting Brine 1 and Brine 2 of Table 1 into the flow cell. The simulated seawater serves as a source for forming $CaCO_3$ scale. The pressure drop across the flow cell was measured during injection/flow of the simulated seawater. Over about a 4-hour period around 23 hours after flow began, the pressure drop across the flow cell increased rapidly from essentially no pressure difference to over 140 psi pressure difference. This indicates that the flow path through the sand pack was rapidly restricted due to scale buildup.

TABLE 1

| Brine 1 | | Brine 2 | |
| --- | --- | --- | --- |
| Composition | Amount (g/L) | Composition | Amount (g/L) |
| NaCl | 49.59 | NaCl | 49.59 |
| $CaCl_2 \cdot 2H_2O$ | 7.48 | $NaHCO_3$ | 1.38 |
| $MgCl_2 \cdot 6H_2O$ | 4.43 | | |
| KCl | 2.0781 | | |
| $BaCl_2 \cdot 2H_2O$ | 1.0138 | | |
| $SrCl_2 \cdot 6H_2O$ | 0.8824 | | |

In a test of a HMAP, the sand pack (after saturation with 3% KCl) was treated with three pore volumes (~38 mL) of 4% hydrophobically modified polyethyleneimine ("PEI") solution. This hydrophobic modified PEI was an amidation product of tall oil fatty acid ("TOFA") and PEI with 50% molar ratio of hydrophobes based on the nitrogen sites of PEI. Then, the simulated seawater was flowed as described in the control experiment. Over a 55-hour test the pressure drop across the flow cell remained the same at essentially no pressure drop. This indicates that the flow path through the sand pack is essentially unchanged and scale buildup in the flow path in negligible.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A method comprising:
preparing a treatment fluid that comprises a base fluid and a plurality of hydrophobically modified amine-containing polymer (HMAP) coated particulates that comprise particulates at least partially coated with an HMAP, wherein the HMAP comprises a plurality of hydrophobic modifications on a poly(vinyl imidazole);
introducing the treatment fluid into a wellbore penetrating a subterranean formation;
forming a particulate pack that comprises at least some of the HMAP-coated particulates; and
inhibiting scale buildup on the HMAP-coated particulates.

2. The method of claim 1, wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

3. The method of claim 1, wherein the particulate comprises at least one selected from the group consisting of a proppant, a gravel particulate, and any combination thereof.

4. The method of claim 1, wherein the HMAP-coated particulates further comprise a coupling agent.

5. The method of claim 1, wherein the HMAP-coated particulates are present in an amount ranging from about 0.1 pounds per gallon to about 30 pounds per gallon of the treatment fluid.

6. The method of claim 1 further comprising:
forming the HMAP-coated particulates by dry-coating the particulates with the HMAP; and
adding the HMAP-coated particulates to the treatment fluid.

7. The method of claim 1, wherein preparing the treatment fluid involves adding HMAP to a mixture of the base fluid and the particulates.

8. The method of claim 1, wherein preparing the treatment fluid involves adding the particulates to a mixture of the base fluid and the HMAP.

9. The method of claim 1 further comprising:
introducing a pad fluid into the subterranean formation at a pressure sufficient to create or extend at least one fracture in the subterranean formation before introducing the treatment fluid.

10. A method comprising:
providing a treatment fluid that comprises a base fluid and a hydrophobically modified amine-containing polymer (HMAP), the HMAP comprising a plurality of hydrophobic modifications on a poly(vinyl imidazole);
introducing the treatment fluid into a wellbore penetrating a subterranean formation, wherein a portion of the wellbore, a portion of the subterranean formation, or both comprise a plurality of particulates;
coating at least some of the particulates with HMAP, thereby forming HMAP-coated particulates; and
inhibiting scale buildup on the HMAP-coated particulates.

11. The method of claim 10, wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

12. The method of claim 10, wherein the particulates comprise at least one selected from the group consisting of formation fines, formation sand, a proppant, a gravel particulate, and any combination thereof.

13. The method of claim 10, wherein the HMAP is present in an amount ranging from about 0.01% to about 3% by weight of the base fluid.

14. The method of claim 10, wherein the treatment fluid further comprises a coupling agent in an amount ranging from about 0.001% to about 3% by weight of the HMAP.

15. The method of claim 10 further comprising:
forming a proppant pack in the portion of the wellbore, the portion of the subterranean formation, or both before introducing the treatment fluid.

16. The method of claim 10 further comprising:
forming a gravel pack in the portion of the wellbore, the portion of the subterranean formation, or both before introducing the treatment fluid.

17. The method of claim 10 further comprising
introducing an acidizing fluid into the subterranean formation before introducing the treatment fluid.

18. A system comprising:
a wellhead with a tubular extending therefrom and into a wellbore in a subterranean formation; and
a pump fluidly coupled to a tubular, the tubular containing a treatment fluid that comprises a base fluid and a plurality of hydrophobically modified amine-containing polymer (HMAP) coated particulates, wherein the HMAP comprises a plurality of hydrophobic modifications on a poly(vinyl imidazole).

* * * * *